US010125742B2

(12) United States Patent
Tanaka et al.

(10) Patent No.: US 10,125,742 B2
(45) Date of Patent: Nov. 13, 2018

(54) WIND POWER GENERATION SYSTEM

(71) Applicant: Hitachi, Ltd., Chiyoda-ku, Tokyo (JP)

(72) Inventors: Kohei Tanaka, Tokyo (JP); Ikuo Tobinaga, Tokyo (JP); Mitsuru Saeki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 448 days.

(21) Appl. No.: 14/448,536

(22) Filed: Jul. 31, 2014

(65) Prior Publication Data
US 2015/0064007 A1 Mar. 5, 2015

(30) Foreign Application Priority Data

Aug. 29, 2013 (JP) .................................. 2013-177480

(51) Int. Cl.
*F03D 1/06* (2006.01)
*F03D 15/10* (2016.01)
*F03D 80/80* (2016.01)
*F03D 15/00* (2016.01)
(Continued)

(52) U.S. Cl.
CPC ............... *F03D 1/065* (2013.01); *F03D 1/06* (2013.01); *F03D 9/25* (2016.05); *F03D 15/00* (2016.05); *F03D 15/10* (2016.05); *F03D 80/88* (2016.05); *F03D 80/70* (2016.05); *F05B 2260/40* (2013.01); *Y02E 10/721* (2013.01); *Y02E 10/726* (2013.01)

(58) Field of Classification Search
CPC .......... F03D 11/02; F03D 11/04; F03D 15/00; F03D 1/06; F03D 1/0608; F03D 1/065; F03D 1/0691; F03D 11/00; F03D 80/80; F03D 80/88
See application file for complete search history.

(56) References Cited

U.S. PATENT DOCUMENTS

| 4,757,211 A * | 7/1988 | Kristensen ............. F03D 80/00 290/44 |
| 8,664,791 B2 * | 3/2014 | Rebsdorf ............... F03D 15/00 290/55 |
| 2009/0015020 A1 | 1/2009 | Stiesdal |

(Continued)

FOREIGN PATENT DOCUMENTS

| JP | 62-282173 A | 12/1987 |
| JP | 2001-200781 A | 7/2001 |

(Continued)

OTHER PUBLICATIONS

English translation of Japanese Office Action issued in counterpart Japanese Application No. 2013-177480 dated Sep. 27, 2016 (three pages).

*Primary Examiner* — David E Sosnowski
*Assistant Examiner* — Sang K Kim
(74) *Attorney, Agent, or Firm* — Crowell & Moring LLP

(57) ABSTRACT

A wind power generation system according to the invention includes: blades configured to receive wind to rotate; a nacelle supporting a load from the blades; a tower supporting the nacelle; a hub supporting the blades and configured to be rotated with the blades; a rotary main shaft configured to be rotated with the rotation of the hub; a gearbox connected to the rotary main shaft and configured to increase a speed of the rotation; and a generator configured to be driven at the rotation speed increased by the gearbox. The rotary main shaft is connected directly to the hub.

12 Claims, 4 Drawing Sheets

(51) Int. Cl.
*F03D 9/25* (2016.01)
*F03D 80/70* (2016.01)

(56) References Cited

U.S. PATENT DOCUMENTS

| | | | |
|---|---|---|---|
| 2013/0011262 A1 | 1/2013 | Xu et al. | |
| 2013/0302144 A1* | 11/2013 | Demtroder | H02K 7/1838 415/124.2 |
| 2014/0064963 A1* | 3/2014 | Tobinaga | F03D 1/00 416/1 |

FOREIGN PATENT DOCUMENTS

| | | |
|---|---|---|
| JP | 2009-138578 A | 6/2009 |
| WO | WO 2012/052022 A1 | 4/2012 |
| WO | WO 2013/021181 A1 | 2/2013 |

* cited by examiner

WIND POWER GENERATION SYSTEM

BACKGROUND OF THE INVENTION

1. Field of the Invention

The present invention relates to a wind power generation system.

2. Description of the Related Art

Wind power generation systems have been introduced widely as a pillar of the renewable energy technology. Wind power generation systems generate power by transmitting the rotating power of blades via the rotation of a hub, which supports the blades, to a main shaft and thereby rotating a generator.

A conventional wind power generation system is described in JP 2001-200781 A, for example. In this document, a nacelle houses a hub that supports blades and rotates with the blades, an elongated rotary main shaft that is located at the inner diameter side of the hub and is connected to the hub through an elastic coupler, a gearbox that is connected to the elongated rotary main shaft, and a generator that receives the rotating power with a speed increased by the gearbox.

In JP 2001-200781 A, the rotary main shaft can be elongated because the shaft is not subjected to bending stress due to the weight of the rotor.

SUMMARY OF THE INVENTION

In the wind power generation system described in JP 2001-200781 A, the elongated rotary main shaft is connected to the hub through the highly flexible elastic coupler, permitting the elastic coupler and the elongated rotary main shaft to achieve flexible deformation due to the rotor weight and thereby alleviating the bending stress and vibration of the rotary main shaft.

This system suffers problems, such as an increase in time for connecting work with an increase in the number of components at the connecting portion between the rotary main shaft and the elastic coupler, an increase in weight of the elastic coupler, and an increase in weight of a frame covering the elongated rotary main shaft. The system also poses a risk of slipping at the connecting surface between the rotary main shaft and the elastic coupler.

Since the connecting surface between the rotary main shaft and the elastic coupler is located at the inner circumference side of the connecting surface between the hub and the elastic coupler, the connecting surface between the rotary main shaft and the elastic coupler needs to have a holding force greater than that of the connecting surface between the hub and the elastic coupler. The connecting surface between the rotary main shaft and the elastic coupler poses a greater risk of slipping than the connecting surface between the hub and the elastic coupler, and thus it is necessary to maintain the joint at the connecting surface between the rotary main shaft and the elastic coupler with high reliability.

It is an object of the invention to provide a wind power generation system with high reliability.

To achieve the object described above, a wind power generation system according to the invention includes: blades configured to receive wind to rotate; a nacelle supporting a load from the blades; a tower supporting the nacelle; a hub supporting the blades and configured to be rotated with the blades; a rotary main shaft configured to be rotated with the rotation of the hub; a gearbox connected to the rotary main shaft and configured to increase a speed of the rotation; and a generator configured to be driven at the rotation speed increased by the gearbox, wherein the rotary main shaft is connected directly to the hub.

With this invention, a wind power generation system with high reliability can be provided.

DESCRIPTION OF THE PREFERRED EMBODIMENTS

Some embodiments of the invention will now be described with reference to the drawings. These specific embodiments are provided just as examples, and the invention is not limited thereto.

First Embodiment

Figure 1:
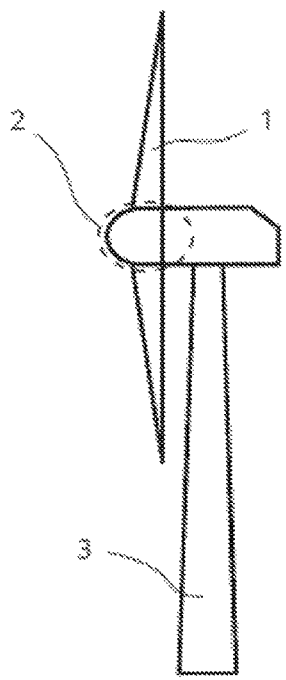
FIG. 1 is an overall view of an external appearance of a wind power generation system.

A first embodiment of the invention will now be described with reference to FIGS. 1 and 2. In FIG. 1, a wind power generation system includes blades 1 that receive wind to rotate, a nacelle 2 that supports a load from the blades 1, and a tower 3 that supports the nacelle 2. The nacelle 2 is supported rotatably in a substantially horizontal plane with respect to the tower 3 and is rotated in response to the wind direction.

Figure 2:
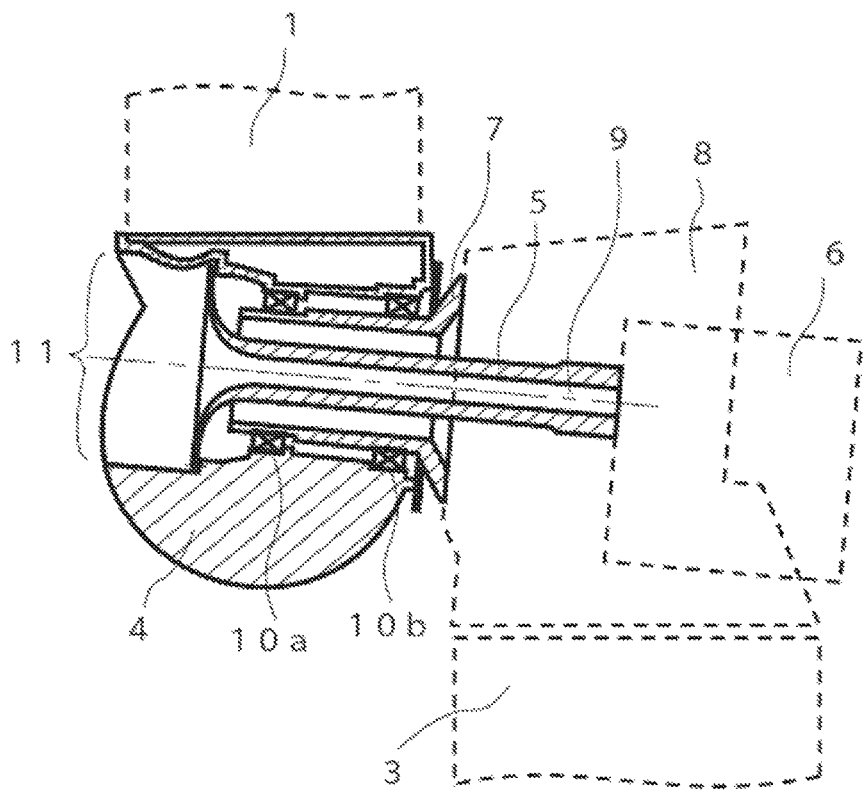
FIG. 2 is a sectional view of a connection mechanism between a hub and a rotary main shaft in the wind power generation system according to an embodiment of the invention.

FIG. 2 is a diagram for describing a connection mechanism between a hub and a rotary main shaft. This diagram corresponds to a region surrounded by a dotted line in FIG. 1. As illustrated in the figure, the wind power generation system according to the embodiment includes the blades 1, a hub 4, a rotary main shaft 5, a gearbox 6, a stationary main shaft 7, and a frame 8. The hub 4 supports the blades 1 and is rotated with the blades 1. The rotary main shaft 5 is connected to the hub 4 to be rotated with the rotation of the hub 4. The gearbox 6 is connected to the rotary main shaft 5 to increase the speed of the rotation. The stationary main shaft 7 is located at the outer diameter side of the rotary main shaft 5 with an air gap from the rotary main shaft 5. The frame 8 supports the stationary main shaft 7 and is connected to the tower 3. The gearbox 6 is connected to a generator, which is not shown, so that the rotating power with the rotation speed increased by the gearbox 6 drives a rotor of the generator to generate power. The rotary main shaft 5 is connected directly to the hub 4 on a step inside the hub 4. The rotary main shaft 5 has a through hole 9 for wiring or piping for the control of an electrical device inside the hub.

The stationary main shaft 7, which is connected to the frame 8 so as to enclose part of the rotary main shaft 5, does not rotate. Two bearings 10a and 10b are provided between the hub 4 and the stationary main shaft 7 to support the weight of the blades 1 and the hub 4.

The hub 4 has an opening 11 in an axial direction of the rotary main shaft 5 at the side opposite to the gearbox 6. The rotary main shaft 5 has a maximum diameter smaller than the inner diameter of the opening 11, so that the rotary main shaft 5 can be brought into the hub 4 through the opening 11.

The rotary main shaft 5 has a bell-mouth shape with its inner and outer diameters expanding in the axial direction of the rotary main shaft 5 from the gearbox 6 side toward a connecting surface of the rotary main shaft 5 to the hub 4. The inner and outer diameters of the rotary main shaft 5 have differences constituting its thicknesses that reduce toward the connecting surface to the hub 4 from the gearbox 6 side, except for an increase in thickness in close proximity to a portion fastened by a bolt to the hub 4. This arrangement permits the rotary main shaft 5 to deform locally at the bell-mouth shaped portion, which is flexible in proximity to the connecting portion to the hub, so that misalignment can accommodated in both of the axial direction and a radial direction of the rotary main shaft 5. The thicknesses described above are set to enhance this accommodating capability.

With the bell-mouth shape accommodating misalignment, the rotary main shaft 5, which is shaped to be shorter than those described in JP 2001-200781 A, can alleviate bending stress and vibration of the rotary main shaft, reducing the size of the frame covering the short rotary main shaft and thereby achieving weight reduction. Additionally, since the elastic coupler described in JP 2001-200781 A is not required, this arrangement eliminates the connecting work for the elastic coupler, achieves weight reduction due to the eliminated elastic coupler and its connecting components, and precludes the risk of slipping between the rotary main shaft and the elastic coupler with the connecting surface therebetween eliminated.

These effects are produced by the direct connection of the rotary main shaft 5 to the hub 4. Here, the direct connection refers to connection not through an elastic coupling material, which is an individual component. For example, a washer or the like used between the rotary main shaft 5 and the hub 4 for bolt fastening falls under the direct connection.

An elastic coupling material is not required because the rotary main shaft 5 has a flexible portion that allows deformation. The flexible portion in this embodiment is the bell-mouth shaped portion, which is provided as an example. A flexible portion in any other shape produces a similar effect.

Second Embodiment

Figure 3:
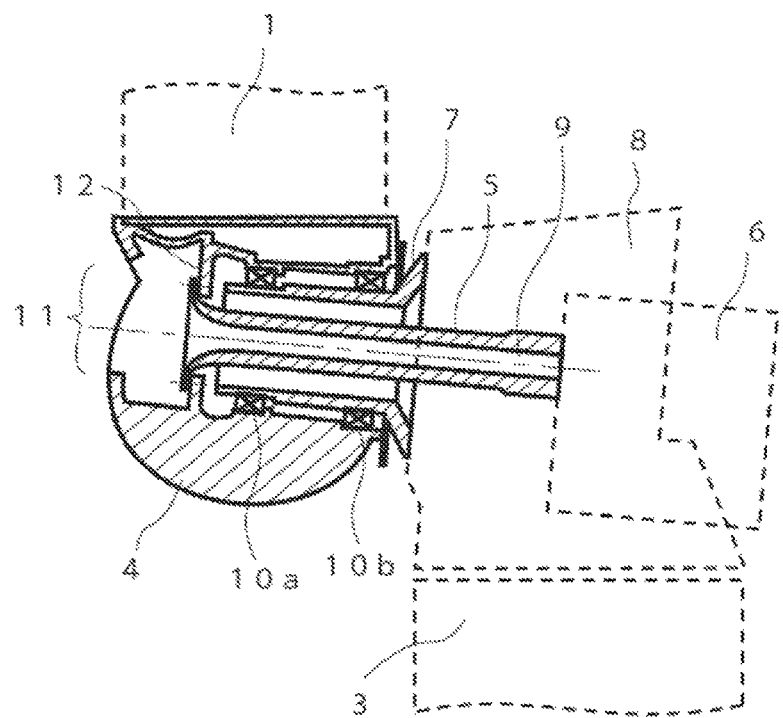
FIG. 3 is a sectional view of a connection mechanism between a hub and a rotary main shaft in a wind power generation system according to an embodiment of the invention.

A second embodiment will now be described with reference to FIG. 3. Duplicated description of the arrangements and effects described in the first embodiment will be omitted here. While the rotary main shaft 5 in the first embodiment is connected to the step inside the hub 4, a rotary main shaft 5 in this embodiment is connected to a hub flange 12, which protrudes in a hub 4, on a surface thereof facing an opening 11 and opposite to a gearbox 6. The rotary main shaft 5 has a bell mouth with its maximum diameter smaller than that of the first embodiment to reduce the opening 11 of the hub 4 and thereby reduce the weight of the hub 4 in comparison with the first embodiment. This arrangement permits the rotary main shaft 5 to deform locally at the bell-mouth shape, so that misalignment can be accommodated in both of the axial direction and the radial direction of the rotary main shaft 5.

Third Embodiment

Figure 4:
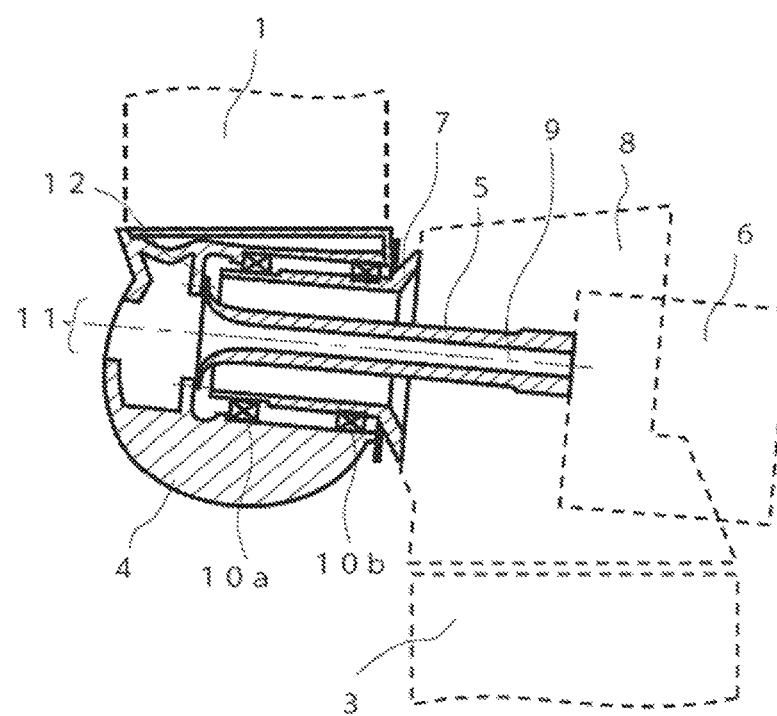
FIG. 4 is a sectional view of a connection mechanism between a hub and a rotary main shaft in a wind power generation system according to an embodiment of the invention.

A third embodiment will now be described with reference to FIG. 4. Duplicated description of the arrangements and effects described in the second embodiment will be omitted here. While the rotary main shaft 5 in the second embodiment is connected to the hub flange 12, which protrudes in the hub 4, on the surface thereof facing the opening 11 and opposite to the gearbox 6, a rotary main shaft 5 in this embodiment is connected to a hub flange 12, which protrudes in a hub 4, on a surface thereof facing a gearbox 6 and opposite to an opening 11. The rotary main shaft 5 has a bell mouth with its maximum diameter smaller than an inner diameter (the minimum diameter) of a stationary main shaft 7 to permit the rotary main shaft 5 to be brought into the hub 4 from the side at which the stationary main shaft 7 is connected to a frame 8. This arrangement minimizes the opening 11 to a size needed for maintenance access to reduce the weight of the hub 4 in comparison with the first and second embodiments. This arrangement permits the rotary main shaft 5 to deform locally at the bell-mouth shape, so that misalignment can be accommodated in both of the axial direction and the radial direction of the rotary main shaft 5.

Fourth Embodiment

Figure 5:
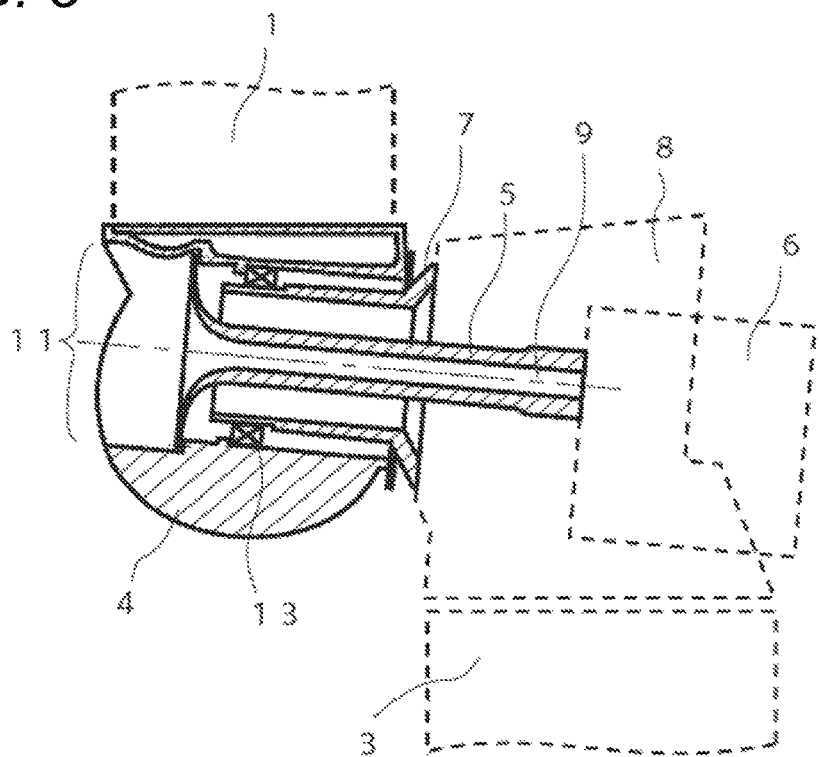
FIG. 5 is a sectional view of a connection mechanism between a hub and a rotary main shaft in a wind power generation system according to an embodiment of the invention.

A fourth embodiment will now be described with reference to FIG. 5. Duplicated description of the arrangements and effects described in the first embodiment will be omitted here. This embodiment provides an arrangement including one bearing 13 located in a hub 4 in place of the two bearings in the first embodiment.

Fifth Embodiment

Figure 6:
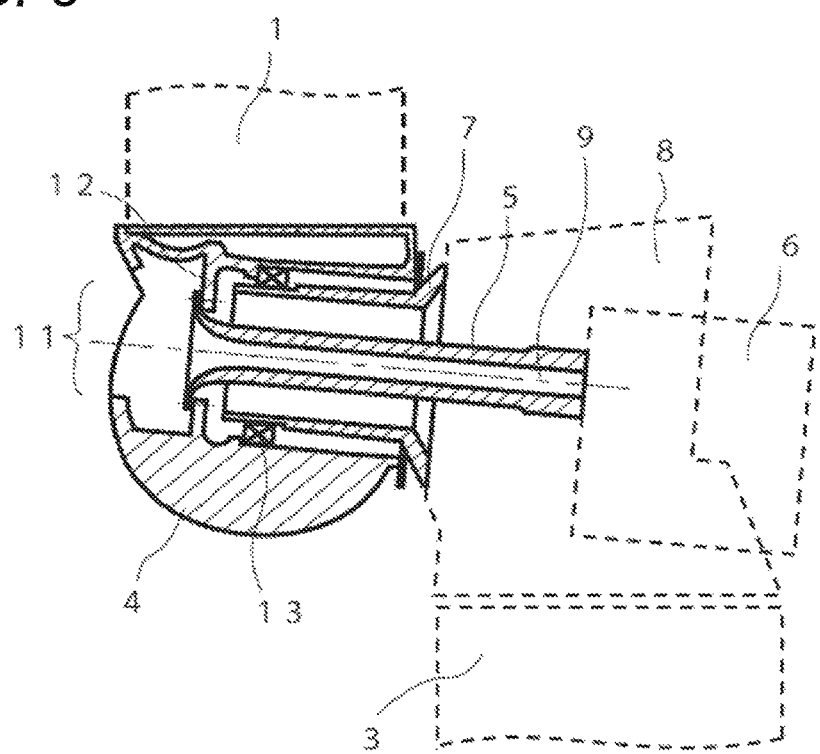
FIG. 6 is a sectional view of a connection mechanism between a hub and a rotary main shaft in a wind power generation system according to an embodiment of the invention.

A fifth embodiment will now be described with reference to FIG. 6. Duplicated description of the arrangements and effects described in the second embodiment will be omitted here. This embodiment provides an arrangement including one bearing 13 located in a hub 4 in place of the two bearings in the second embodiment.

Sixth Embodiment

Figure 7:
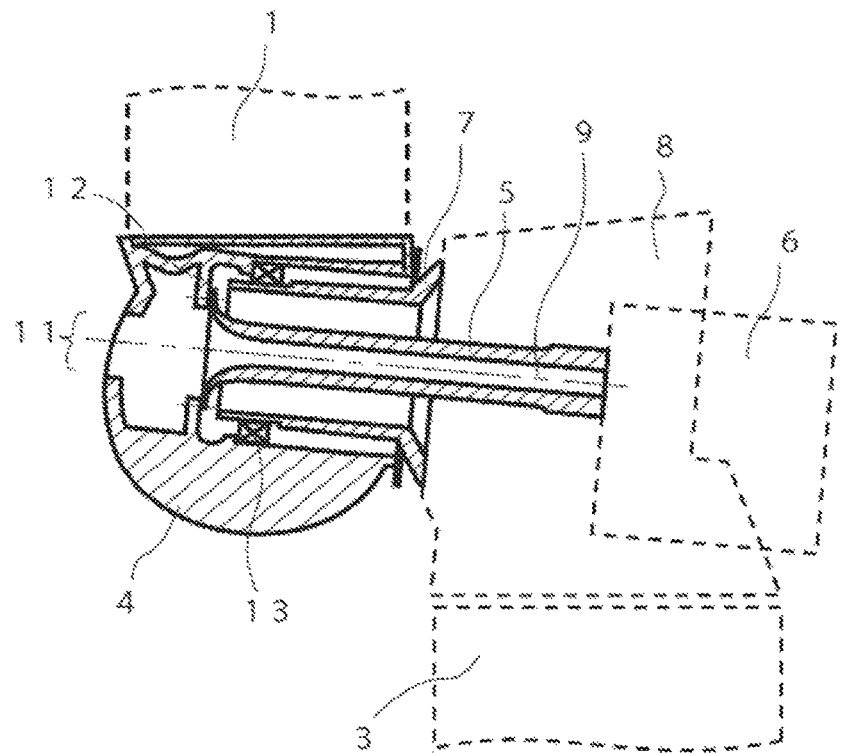
FIG. 7 is a sectional view of a connection mechanism between a hub and a rotary main shaft in a wind power generation system according to an embodiment of the invention.

A sixth embodiment will now be described with reference to FIG. 7. Duplicated description of the arrangements and effects described in the third embodiment will be omitted here. This embodiment provides an arrangement including one bearing 13 located in a hub 4 in place of the two bearings in the third embodiment.

Seventh Embodiment

A seventh embodiment will now be described with reference to FIGS. 8A and 8B. In each of the embodiments described above, the rotary main shaft 5 has a flexible portion that allows deformation. In this embodiment, a flexible portion is also provided in a hub 4 to allow deformation.

Figure 8A:
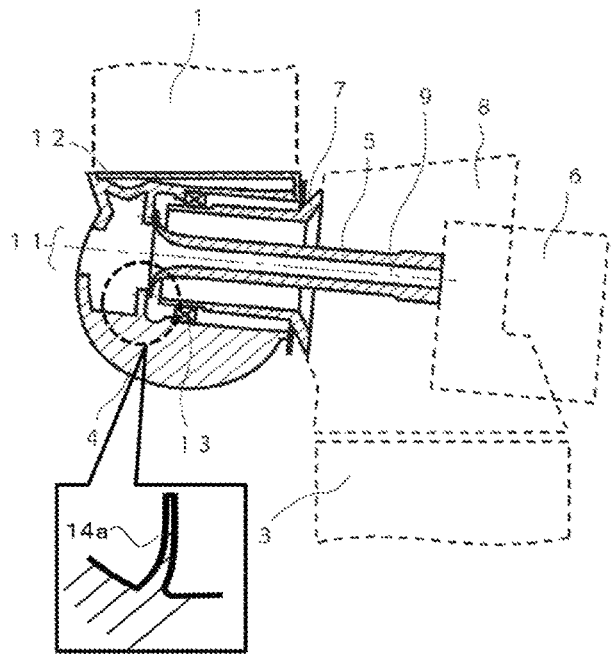
FIG. 8A is a diagram of an example hub arrangement in a wind power generation system according to an embodiment of the invention.

An example is illustrated in FIG. 8A. As illustrated in an enlarged view enclosed in a square in FIG. 8A, a hub flange 14a has a curved-surfaced structure to impart flexibility also to the hub 4, so that the flexibility can be improved further for the entire structure.

Figure 8B:
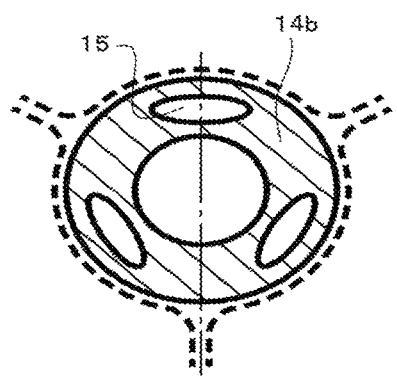
FIG. 8B is a diagram of an example hub arrangement in the wind power generation system according to the embodiment of the invention.

Another example is illustrated in FIG. 8B. FIG. 8B is a diagram of a hub flange 14b observed from the axial direction of a rotary main shaft 5. As illustrated in this figure, an air gap 15 may be provided in the hub flange 14b to impart flexibility also to a hub 4. As a result, the flexibility can be improved further for the entire structure. This example can also reduce the weight of the hub 4.

What is claimed is:

1. A wind power generation system, comprising:
   blades configured to receive wind to rotate;
   a nacelle supporting a load from the blades;
   a tower supporting the nacelle;
   a frame connected to the tower;
   a hub housing supporting the blades and configured to be rotated with the blades;
   a rotary main shaft configured to be rotated with the rotation of the hub housing;
   a stationary main shaft that is connected to the frame and that encloses part of the rotary main shaft;
   a gearbox connected to the rotary main shaft and configured to increase a speed of the rotation; and
   a generator configured to be driven at the rotation speed increased by the gearbox, wherein
      the rotary main shaft has a flexible portion that allows deformation, and
      the rotary main shaft is made of a single unitary body having a first end and a second end, the first end of the rotary main shaft being cylindrical and being disposed radially inward relative to the stationary main shaft, the second end of the rotary main shaft: i) being opposite to the first end, and ii) having an outermost portion that is radially outward relative to an outermost surface of the stationary main shaft.

2. The wind power generation system according to claim 1, wherein
   the flexible portion is a bell-mouth shaped portion expanding toward a connecting portion to the hub housing.

3. The wind power generation system according to claim 2, wherein
   the rotary main shaft has a through hole, so that the rotary main shaft has inner and outer diameters with differences constituting thicknesses thereof that reduce in the bell-mouth shaped portion toward the connecting portion to the hub housing.

4. The wind power generation system according to claim 1, wherein
   the hub housing has an opening in an axial direction of the rotary main shaft at a side opposite to the gearbox, and
   the rotary main shaft has a maximum diameter smaller than an inner diameter of the opening.

5. The wind power generation system according to claim 1, further comprising:
   a bearing located between the hub housing and the stationary main shaft.

6. The wind power generation system according to claim 1, wherein
   the hub housing has a flexible portion that allows deformation.

7. The wind power generation system according to claim 1, wherein the rotary main shaft has a first end at the flexible portion thereof, and a second end opposite to the first end, the second end being cylindrical and the first end having a flange shape.

8. The wind power generation system according to claim 1, wherein the hub housing defines an interior cavity having a stepped portion, the stepped portion including an axially facing surface that directly engages with the second end of the rotary main shaft.

9. A rotary main shaft connecting a rotation body to a rotation body for a wind power generation system, wherein
   the rotary main shaft comprises a flexible portion that allows deformation; and
   the wind power generation system, comprises
      blades configured to receive wind to rotate,
      a nacelle supporting a load from the blades,
      a tower supporting the nacelle,
      a frame connected to the tower,
      a hub housing supporting the blades and configured to be rotated with the blades,
      a rotary main shaft configured to be rotated with the rotation of the hub housing,
      a stationary main shaft that is connected to the frame and that encloses part of the rotary main shaft,
      a gearbox connected to the rotary main shaft and configured to increase a speed of the rotation,
      a generator configured to be driven at the rotation speed increased by the gearbox, the rotary main shaft being connected directly to the hub housing, wherein
         the rotary main shaft is made of a single unitary body having a first end and a second end, the first end of the rotary main shaft being cylindrical and being disposed radially inward relative to the stationary main shaft, the second end of the rotary main shaft: i) being opposite to the first end, and ii) having an outermost portion that is radially outward relative to an outermost surface of the stationary main shaft.

10. The rotary main shaft according to claim 9, wherein the rotary main shaft has a first end at the flexible portion thereof, and a second end opposite to the first end, the second end being cylindrical and the first end having a flange shape.

11. The rotary main shaft according to claim 9, wherein the hub housing defines an interior cavity having a stepped portion, the stepped portion including an axially facing surface that directly engages with the second end of the rotary main shaft.

12. A wind power generation system, comprising:
   blades configured to receive wind to rotate;
   a nacelle supporting a load from the blades;
   a tower supporting the nacelle;
   a hub housing supporting the blades and configured to be rotated with the blades;
   a rotary main shaft configured to be rotated with the rotation of the hub housing;
   a gearbox connected to the rotary main shaft and configured to increase a speed of the rotation; and
   a generator configured to be driven at the rotation speed increased by the gearbox, wherein
      the rotary main shaft has a flexible portion that allows deformation,
      the rotary main shaft is made of a single unitary body having a first end and a second end, and the hub housing defines an interior cavity having a stepped portion, the stepped portion including an axially facing surface that directly engages with the second end of the rotary main shaft.

* * * * *